United States Patent [19]

Luhleich et al.

[11] 4,299,881
[45] Nov. 10, 1981

[54] GRAPHITIC MOLDED ARTICLE WITH CORROSION-RESISTANT SURFACE LAYER STABLE UNDER STRESS

[75] Inventors: Hartmut Luhleich, Duren; Peter Pflaum; Francisco J. Dias, both of Jülich; Aristides Nauomidis, Jülich-Koslar; Arno Schirbach, Stolberg; Hubertus Nickel, Jülich-Koslar, all of Fed. Rep. of Germany

[73] Assignee: Kernforschungsanlage Jülich Gesellschaft mit beschrankter Haftung, Jülich, Fed. Rep. of Germany

[21] Appl. No.: 122,611

[22] Filed: Feb. 19, 1980

Related U.S. Application Data

[63] Continuation of Ser. No. 899,574, Apr. 24, 1978, abandoned.

[30] Foreign Application Priority Data

Apr. 23, 1977 [DE] Fed. Rep. of Germany ....... 2718142
Apr. 23, 1977 [DE] Fed. Rep. of Germany ....... 2718143

[51] Int. Cl.³ .................... B32B 3/26; B32B 9/00; C01B 31/36
[52] U.S. Cl. .................... 428/308; 428/309; 428/327; 428/331; 428/332; 428/408; 428/325; 428/446; 428/448; 428/316; 428/698; 264/58; 264/60
[58] Field of Search ............... 428/408, 409, 446, 448, 428/539, 310, 311, 316, 308, 309, 327, 331, 332; 427/249; 269/105, 109

[56] References Cited

U.S. PATENT DOCUMENTS

| | | | |
|---|---|---|---|
| 2,929,741 | 3/1960 | Steinberg | 427/249 |
| 2,992,127 | 7/1961 | Jones | 428/408 |
| 3,073,717 | 1/1963 | Pyle et al. | 428/408 |
| 3,095,316 | 6/1963 | Hartwig | 428/408 |
| 3,393,084 | 7/1968 | Hartwig | 428/408 X |
| 3,925,577 | 12/1975 | Fatzer et al. | 427/249 |
| 3,969,131 | 7/1976 | Fatzer et al. | 428/316 |
| 4,206,263 | 6/1980 | Rieger et al. | 428/446 X |

FOREIGN PATENT DOCUMENTS

| | | |
|---|---|---|
| 1796279 | 5/1958 | Fed. Rep. of Germany . |
| 713710 | 8/1954 | United Kingdom . |
| 1118056 | 6/1968 | United Kingdom . |

*Primary Examiner*—P. Ives
*Attorney, Agent, or Firm*—Frishauf, Holtz, Goodman & Woodward

[57] ABSTRACT

In order to prevent a protective carbide layer on a graphitic molded article from splitting off under thermal stress, an external carbide layer is provided on a graphitic molded article having a graded content of silicon or zirconium (in the carbide state) that increases from near zero at the interior boundary of the layer to about 50 atomic percent at the exterior. Such a layer is produced either by dipping the graphitic molded article into melted silicon, dipping it into a succession of suspensions of carbon and either silicon or zirconium, with a greater silicon or zirconium content in each successive dip, the suspensions also including a binder resin, or by applying layers of a paste of carbon and either silicon or zirconium, also with some resin, each successive layer having a higher silicon or zirconium content. In the case of the successive dipping into suspensions, the article is dried after each dip and then heated to harden the binder, and in the case of application of successive paste layers, the binder is likewise hardened each time. In each case, the treatment terminates with heating to a coking temperature, followed by a rapid rise of temperature to a value at which silicon carbide or zirconium carbide will be formed, followed by cooling to room temperature.

4 Claims, No Drawings

GRAPHITIC MOLDED ARTICLE WITH CORROSION-RESISTANT SURFACE LAYER STABLE UNDER STRESS

This is a continuation of application Ser. No. 899,574, filed Apr. 24, 1978, now abandoned.

CROSS REFERENCE TO RELATED APPLICATION

Ser. No. 886,419, filed, Mar. 14, 1978, now abandoned, H. Luhleich and F. J. Dias.

This invention concerns molded articles of a graphitic composition having a protective outer skin for increasing their resistance to corrosive effects at high temperatures, and methods of making such articles.

Such molded articles are particularly useful in the form of crucibles or other containers in a variety of chemical applications in which it is necessary to carry out reactions at high temperature. The graphitic material of which such articles are molded consists of carbonaceous particles in the form of graphite, artificial graphite or the like coated with a binder.

There is considerable variety among the known methods of making molded articles of graphite or graphite-like carbon particles (compare German Pat. No. 20 40 252). Among these methods are procedures for making such articles by making a mass or paste from suspensions formed of filler materials such as artificial graphites or materials similar to artificial graphites coated with a binder of synthetic resin, such as phenolformaldehyde, or of pitch, tar or the like. Powders of petroleum coke, electrographite, carbon black or the like are used as artificial graphites. In manufacture the binder is fully or partly dissolved in a liquid in which the filler is suspended. The solution is then added into a percipitating liquid with which the solvent is miscible, but in which the binder is either insoluble or soluble only with difficulty. Water, for instance, is used as a precipitating liquid and an alcohol is utilized as the solvent when phenolformaldehyde resin is used as the binder. The suspension formed in this manner is dried and the resulting powder is packed into a mold and then exposed to vapors of liquids in which the binder is partly or fully soluble. The molded body made in this manner is then dried and coked (see German Pat. No. 2 133 044).

Another known process making molded articles consists in taking artificial graphite, or similar materials that are set with phenolformaldehyde resin, with formaldehyde gas penetrating inwards from the surface of the article to the interior while applying heat at a temperature of 100° C. to 200° C., with the concentration of the gas depending upon a predetermined degree of cross-linking of the molded article.

Recently an improved process has been devised for making a molding material for the manufacture of artificial graphite articles, described in the copending application of two of the present inventors, Ser. No. 886,419, filed Mar. 14, 1978, now abandoned.

Crucibles and other equipment made of carbonaceous material have the disadvantage that they are sensitive to corrosion if they are utilized where they can be attacked by oxygen or, for example, where the reaction produces water vapor. In order to counteract or prevent this damaging effect, it has already been tried to provide coatings of corrosion resistant substances on crucibles or other apparatus made of carbon or grahite. One known procedure intended to provide such protection consists in applying covering layers on the surfaces of the articles that are exposed to corroding influence. In this known procedure such protective layers were formed by the deposition of silicon carbide or zirconium carbide on the surfaces.

Another known procedure consists in high temperature spraying, using a plasma gun, to liquify silicon carbide and zirconium carbide and to spray the materials on the reaction vessel or apparatus surfaces to be protected. A disadvantage of these known processes is their very great expense. A further considerable disadvantage is to found in that in layers formed in this manner, carbon or graphite used as the material for the crucible or other article and the silicon carbide or zirconium carbide of the layer produced have different thermal expansion coefficients. Thus, for example, the thermal expansion coefficient of the carbonaceous material generally used is in the order of magnitude of $1\cdot10^{-5}$ to $1\cdot10^{-6}$ at room temperature, while the corresponding coefficient for SiC is $6.6\cdot10^{-5}$. The undesirable consequences of this different behavior under temperature change are mainly that the SiC layer often breaks off upon cooling after being heated up and the vessel accordingly has only a short useful life for its intended purpose.

It is an object of the present invention to provide a molded article of graphite, artificial graphite or similar material having an outer skin, layer or coating that has a long useful life even under high stress and to provide a method of manufacture for such molded articles, and in particular a method also useable for the production or completion of large shaped parts.

SUMMARY OF THE INVENTION

Briefly, the molded article of graphitic material is encased in one or more layers of the molding material mixed with an atomic percentage of silicon or zirconium that varies from nearly zero to about 50% increasing from the inside to the outside of the encasing layer or layers.

The molded articles thus encased can be made in a very simple matter by one or another of the methods of the present invention.

In a first method according to the invention, a molded body of graphitic material is dipped into a bath of molten silicon that is maintained under vacuum or under a protective gas atmosphere at low pressure and, after removal from the silicon bath, the body is heated up to a temperature of about 180° C. for the formation of silicon carbide, after which it is cooled down to room temperature.

As a result of the high temperature treatment to which the graphitic body is subjected after being drawn out of the melt, the free silicon still present in the outer layers of the body is converted together with graphite into silicon carbide. The silicon carbide at the same time diffuses into the graphitic body, so that between the outer silicon carbide protective layer and the graphitic body a zone is produced with a tapering silicon carbide content. The formation of such a transition zone between the outer silicon carbide layer and the graphite of the molded body, with the silicon content tapering down from the outside towards the inside, is important because in that fashion the result is obtained that even under strong temperature changes the silicon carbide protective layer adheres firmly to the graphitic body.

In order to assure that the outer pores of the graphitic body are entirely filled with silicon, it is very desirable that after the dipping of the graphitic body into the silicon melt, a protective gas atmosphere should exert on the melt a pressure corresponding at least to normal atmospheric pressure.

A second method for the manufacture of molded bodies with a protective layer according to the invention is provided by first suspending silicon or zirconium powder in a phenolformaldehyde resin solution that already contains graphitic powder and then dipping the molded body one or more times into this suspension, after which the molded body is heated up in a succeeding process step to a temperature lying between 650° C. and 850° C. or coking, immediately after which it is heated up very rapidly to a temperature between 1550° C. and 1800° C. for the formation of silicon carbide, after which it is cooled down to room temperature.

In order to produce a coating that is particularly resistant to corrosion by the general method above described, it is highly advantageous to provide several different suspensions of the silicon or zirconium powder respectively containing different levels of carbon content lying between 95 atomic % and 50 atomic % and to dip the molded body first in the suspension bath with the lowest silicon or zirconium content and the highest carbon content and then successively in the baths with the next lowest carbon content until it is finally dipped into the bath with the lowest carbon content and the highest relative silicon or zirconium content, and after each dipping to dry the body and to subject it to a heat treatment to harden the binder of the layer just applied by the previous dipping.

In a third method for manufacture of graphitic molded articles with a protective outer skin or layer, a molded body is first produced of a mass of graphite particles, artificial graphite particles or particles similar to artificial graphite particles, coated with a binder, and then there is applied, in the form of a layer on the molded body one or more coatings or shells of a mass of the material used for making the molded body with an admixture of silicon or zirconium in an atomic percent that varies from nearly zero to about 50%, in such a way that the layer nearer the core of the molded body has the smallest silicon or zirconium content and that the outer most layer has the highest silicon or zirconium content, with any intermediate layers provided having intermediate silicon or zirconium content or gradation of the silicon or zirconium content from the inside to the outside of the coating layers. The molded body thus coated is then coked in a protective gas atmosphere at temperatures between 650° C. and 850° C., after which it is brought with great rapidity of heating up to a temperature in the range from about 1550° C. to 1800° C. for the formation of silicon carbide in the outer layers, after which the articles are cooled down to room temperature.

Articles made according to any of the three above described varieties of process according to the present invention were found to meet all the desired requirements regarding withstanding stress and long useful life and, in particular, it was found that the silicon carbide or zirconium carbide layer remained firmly bound to the graphitic body even under high stress.

The protective gas atmospheres mentioned above may be an inert gas, such as argon.

The invention is further described by way of specific examples of the methods of making a molded body in accordance with the invention in each of the two different ways utilizing the provision of successive layers by the utilization of a series of mixtures containing silicon, graphite and phenolformaldehyde resin.

EXAMPLE I

Graphite and silicon powder were suspended in varying quantities in alcoholic solutions of phenolformaldehyde resin as follows:

| Mixture 1 (Si:C = 0.2:1) | |
| --- | --- |
| silicon | 278.4 g |
| phenolformaldehyde resin | 250.0 g |
| graphite | 471.6 g |
| Mixture 2 (Si:C = 0.4:1) | |
| silicon | 422.4 g |
| phenolformaldehyde resin | 250.0 g |
| graphite | 327.6 g |
| Mixture 3 (Si:C = 0.6:1) | |
| silicon | 510.4 g |
| phenolformaldehyde resin | 250.0 g |
| graphite | 239.6 g |
| Mixture 4 (Si:C = 0.8:1) | |
| silicon | 569.9 g |
| phenolformaldehyde resin | 250.0 g |
| graphite | 180.2 g |
| Mixture 5 (Si:C = 1:1 stoichiometric) | |
| silicon | 612.5 g |
| phenolformaldehyde resin | 250.0 g |
| graphite | 137.5 g |

In the above mixture compositions, the silicon:carbon atomic ratio is given in parentheses (including carbon in the resin).

The graphitic molded body was first dipped in the suspension with the lowest silicon content (Mixture 1), then removed from the suspension and dried. Thereafter, the molded body was subjected to a heat treatment sufficient to harden the phenolformaldehyde resin binder of the first layer thus applied to the body. This dipping, drying and heat treatment procedure was then repeated with the other suspensions in the order given above. Because the silicon content of the suspension increased from one dipping to the next, the silicon content in the successive layers deposited likewise increased. The increase of silicon from layer to layer continued until in the outermost layer it corresponded to a stoichiometric ratio of silicon to carbon.

After the cycle of steps of dipping, drying and heat treatment was completed for the last layer, the molded body with its protective layers was heated to about 700° C. in a protective atmosphere of argon to coke or carbonize the binder and then, quickly, at 30° C./min, brought up to a temperature of about 1800° C. in order to produce the conversion of silicon and some of the carbon into silicon carbide.

Thereafter the protectively coated molded articles were cooled down to room temperature.

EXAMPLE II

The molded articles treated in accordance with the invention in this case were made of particles of electrographite coated with phenolformaldehyde resin as a binder, by pressing the material so obtained in a mold. The same material used for molding was then mixed with silicon powder similarly coated with phenolformaldehyde to produce a series of five pastes corresponding in composition with respect to silicon, phenolformaldehyde resin and graphite to the suspension mixtures given in Example I as mixture 1, mixture 2, mixture 3, mixture 4 and mixture 5, respectively.

These pasty mixtures were applied as layers of a thickness of about 1 to 2 mm each on the molded body, with the layer having the lowest silicon content next to the molded body and with the successive layers having successively increasing silicon content. In other words the compositions were applied as layers in the order in which they appear in the listing in Example I, with the outer and last layer having the highest silicon content with an equal atomic percentage of silicon and carbon (Mixture 5).

Thereafter the molded body thus coated was heated up to a temperature of 800° C. in a protective atmosphere in order to coke the layers. The coated molded body was then heated up to a temperature of 1800° C. at a temperature rise rate of about 30° C./min., after which it was cooled down. It was found that as a result of heating up to the temperature just mentioned a silicon carbide layer had been formed at the outer surface. This layer exhibited a high degree of adherence even under high stress and possessed the desired capability of resisting corrosion.

The procedures of Examples I and II may be followed with the substitution of zirconium powder for silicon powder in the same atomic percentages relative to the amount of carbon, with similar results. The procedures of Examples I and II have the advantage of establishing the silicon or zirconium content of the outer layers in a manner independent of the particular material chosen for the making of the molded portion of the article, whereas the procedure of dipping the molded article in melted silicon may be subject to a rate of impregnation of the surface depending upon the kind of graphitic material used in making the molded body.

It is also possible to provide an effective protective coating for graphitic molded articles by forming an outer skin or coating containing both silicon and zirconium, in which case the total atomic percentage of silicon and zirconium should increase from near zero at the inside of the skin layer to about 50% at the outside, but it is generally more convenient to handle only a single additive material for the protective shell.

Although the invention has been described with reference to particular specific examples, it will be understood that variations are possible within the inventive concept.

We claim:

1. A molded body of a coked particle material selected from the group consisting of carbonaceous particles containinmg carbon in the naturally occurring graphitic state and carbonaceous particles containing carbon in an artificially produced state corresponding to or resembling that of graphite, said body having a fired corrosion-resistant skin adhering thereto with thermal stability regardless of the degree of porosity of said body, said skin consisting of a porous surface portion of said body of carbonaceous composition at least 2 mm thick and having a percentage content of an admixed element selected from the group consisting of silicon and zirconium, which percentage content progressively and gradually increases from the inside to the outside of said skin from nearly zero atomic % to about 50 atomic % and is present essentially in the form of a carbide of said element.

2. A molded body as defined in claim 1 in which said skin consists of a plurality of superposed porous layers of which the atomic % content of said admixed element gradually increases from layer to layer from the inside to the outside of said skin.

3. A molded body of a coked particle material selected from the group consisting of carbonaceous particles containing carbon in the naturally occurring graphitic state and carbonaceous particles containing carbon in an artificially produced state corresponding to or resembling that of graphite, said body having a fired corrosion-resistant skin adhering thereto with thermal stability regardless of the degree of porosity of said body, said skin consisting of a porous surface portion of said body of carbonaceous composition at least 2 mm thick and having a percentage content of an admixed element selected from the group consisting of silicon and zirconium, which percentage content progressively and gradually increases from the inside to the outside of said skin from nearly zero atomic % to about 50 atomic % and is present essentially in the form of a carbide of said element, said skin consisting of a plurality of superposed porous layers of which the atomic % content of said admixed element gradually increases from layer to layer from the inside to the outside of said skin, said layers being produced by dipping the molded body successively into suspensions of said carbonaceous particles and of powder of said element in a phenolformaldehyde resin solution followed by and heating to binder hardening temperature after each dip, the suspended particle content of the respective solutions corresponding to the compositions of the layers thereby formed, and then coking the layers and forming carbide therein by a higher temperature heat treatment.

4. A molded body of a coked particle material selected from the group consisting of carbonacenous particles containing carbon in the naturally occurring graphitic state and carbonaceous particles containing carbon in an artificially produced state corresponding to or resembling that of graphite, said body having a fired corrosion-resistant skin adhering thereto with thermal stability regardless of the degree of porosity of said body, said skin consisting of a porous surface portion of said body of carbonaceous composition at least 2 mm thick and having a percentage content of an admixed element selected from the group consisting of silicon and zirconium, which percentage content progressively and gradually increases from the inside to the outside of said skin from nearly zero atomic % to about 50 atomic & and is present essentially in the form of a carbide of said element, said skin consisting of a plurality of superposed porous layers of which the atomic % content of said admixed element gradually increases from layer to layer from the inside to the outside of said skin, said layers being produced by applying to said molded body before coking thereof, while it is consolidated only by a hardened resin binder, successive layers of the same material which was used, before hardening of the resin binder, to make said body, to which material the content of said element has been admixed in the form of a powder of said element, with heating the body after the application of each layer to a resin-hardening temperature, and finally firing said body with all said layers thereon for coking and for conversion of said element to a carbide thereof.

* * * * *